(12) United States Patent
Ichikawa

(10) Patent No.: US 7,686,696 B2
(45) Date of Patent: Mar. 30, 2010

(54) CONSTANT VELOCITY JOINT

(75) Inventor: Kazuyuki Ichikawa, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 341 days.

(21) Appl. No.: 11/670,825

(22) Filed: Feb. 2, 2007

(65) Prior Publication Data
US 2007/0202958 A1   Aug. 30, 2007

(30) Foreign Application Priority Data
Feb. 24, 2006  (JP) .............................. 2006-049023

(51) Int. Cl.
*F16D 3/224*  (2006.01)
(52) U.S. Cl. ...................... 464/145; 464/906
(58) Field of Classification Search ................ 464/140, 464/143, 145, 146, 906
See application file for complete search history.

(56) References Cited
U.S. PATENT DOCUMENTS

| | | | | |
|---|---|---|---|---|
| 4,305,263 | A | * | 12/1981 | Kako et al. ................. 464/145 |
| 5,222,914 | A | * | 6/1993 | Mazziotti ..................... 464/145 |
| 6,186,899 | B1 | * | 2/2001 | Thomas et al. ............... 464/145 |
| 2002/0077186 | A1 | * | 6/2002 | Hosoya et al. ............... 464/145 |
| 2005/0070364 | A1 | * | 3/2005 | Matsumoto et al. ......... 464/145 |
| 2005/0202881 | A1 | * | 9/2005 | Ohwaki et al. .............. 464/145 |
| 2006/0205522 | A1 | | 9/2006 | Ichikawa et al. |
| 2006/0217207 | A1 | * | 9/2006 | Hoshino et al. ............. 464/145 |
| 2006/0240895 | A1 | | 10/2006 | Yamano et al. |

FOREIGN PATENT DOCUMENTS

JP 58-214019 12/1983
WO WO03056198 * 7/2003

* cited by examiner

*Primary Examiner*—Greg Binda
(74) *Attorney, Agent, or Firm*—Oblon, Spivak, McClelland, Maier & Neustadt, L.L.P.

(57) ABSTRACT

A constant velocity joint 10 comprises an outer race 12, an inner race 11, balls 14 and a cage 13. The outer race 12 has a partially spherical inner surface 12a provided with plural outer ball grooves 12b. The inner race 11 has a partially spherical outer surface 11a provided with plural inner ball grooves 11b arranged to correspond to the outer ball grooves 12b. The balls 14 are interposed between the outer ball grooves 12b and the inner ball grooves 11b. The radial distance of the outer ball grooves 12b from the rotational axis of the outer race increases toward an opening end of the outer race 12 in a predetermined zone H, and a contact angle θ between each ball 14 and each outer ball groove 12b decreases toward the opening end of the outer race 12 in the predetermined zone H.

9 Claims, 6 Drawing Sheets

Table 1

|  | Ball | Outer race | | | | | |
|---|---|---|---|---|---|---|---|
|  | Ball diameter | Ball groove taper angle γ (deg.) | Zone H (mm.) | Contact angle θ1 (deg.) at A-point | Ball groove curvature ratio at A-point | Contact angle θ2 (deg.) at B-point | Ball groove curvature ratio at B-point |
| Min. | 14 | 0 | 2 | 15 | 1.02 | 0 | 1.02 |
| Max. | 24 | 5 | 25 | 25 | 1.1 | 15 | 1.1 |

Table 2

|  | Ball | Outer race | | | | | |
|---|---|---|---|---|---|---|---|
|  | Ball diameter | Ball groove taper angle γ (deg.) | Zone H (mm.) | Contact angle θ1 (deg.) at A-point | Ball groove curvature ratio at A-point | Contact angle θ2 (deg.) at B-point | Ball groove curvature ratio at B-point |
| Min. | 14 | 0 | 2 | 25 | 1.02 | 0 | 1.02 |
| Max. | 24 | 5 | 25 | 35 | 1.1 | 25 | 1.1 |

Table 3

|  | Ball | Outer race | | | | | |
|---|---|---|---|---|---|---|---|
|  | Ball diameter | Ball groove taper angle γ (deg.) | Zone H (mm.) | Contact angle θ1 (deg.) at A-point | Ball groove curvature ratio at A-point | Contact angle θ2 (deg.) at B-point | Ball groove curvature ratio at B-point |
| Min. | 14 | 0 | 2 | 35 | 1.02 | 0 | 1.02 |
| Max. | 24 | 5 | 25 | 45 | 1.1 | 35 | 1.1 |

Fig. 5

CONSTANT VELOCITY JOINT

INCORPORATION BY REFERENCE

The present application claims priority under 35 U.S.C. §119 to Japanese Patent Application No. 2006-049023, filed on Feb. 24, 2006. The contents of that application are incorporated herein by reference in their entirety.

BACKGROUND OF THE INVENTION

1. Field of the Invention

This invention relates to a constant velocity joint.

2. Discussion of the background

Japanese patent application publication No. 58-214019 discloses a constant velocity joint whose outer race has plural outer ball grooves. The outer ball grooves are undercut so that a bottom of each outer ball groove is located at a longer distance from a rotational axis of the outer race at a longitudinally central portion of the outer ball groove than at its opening end. Because the undercut is not easily forged, machined or ground, the manufacturing cost of the outer ball groove increases.

Another conventional constant velocity joint is a so-called undercut free joint whose outer race has plural ball grooves extending parallel to the rotational axis of the outer race from the center portion to the opening side.

SUMMARY OF THE INVENTION

According to the invention, a constant velocity joint comprises an outer race whose inner surface has plural outer ball grooves, an inner race whose outer surface has plural inner ball grooves corresponding in position to the outer ball grooves, plural balls interposed between the outer and inner ball grooves respectively, and a cage interposed between the inner surface of the outer race and the outer surface of the inner race to hold the balls. In addition, in a predetermined zone of the outer ball grooves, the radial distance of the bottoms of the outer ball grooves from the rotational axis of the outer race invariably increases when moving toward an opening end of the outer race. Further, a contact angle between each outer ball groove and each ball invariably decreases toward the opening end in the predetermined zone.

BRIEF DESCRIPTION OF THE DRAWINGS

Various objects, features and many of the attendant advantages of the present invention will be readily appreciated as the same becomes better understood by reference to the following detailed description of the preferred embodiments when considered in connection with the accompanying drawings, in which:

FIG. 5 shows tables of condition values of the analysis.

DESCRIPTION OF THE PREFERRED EMBODIMENTS

An embodiment of a constant velocity joint related to the present invention will be described with reference to figures.

(1) Assembly of the Constant Velocity Joint

Figure 1:
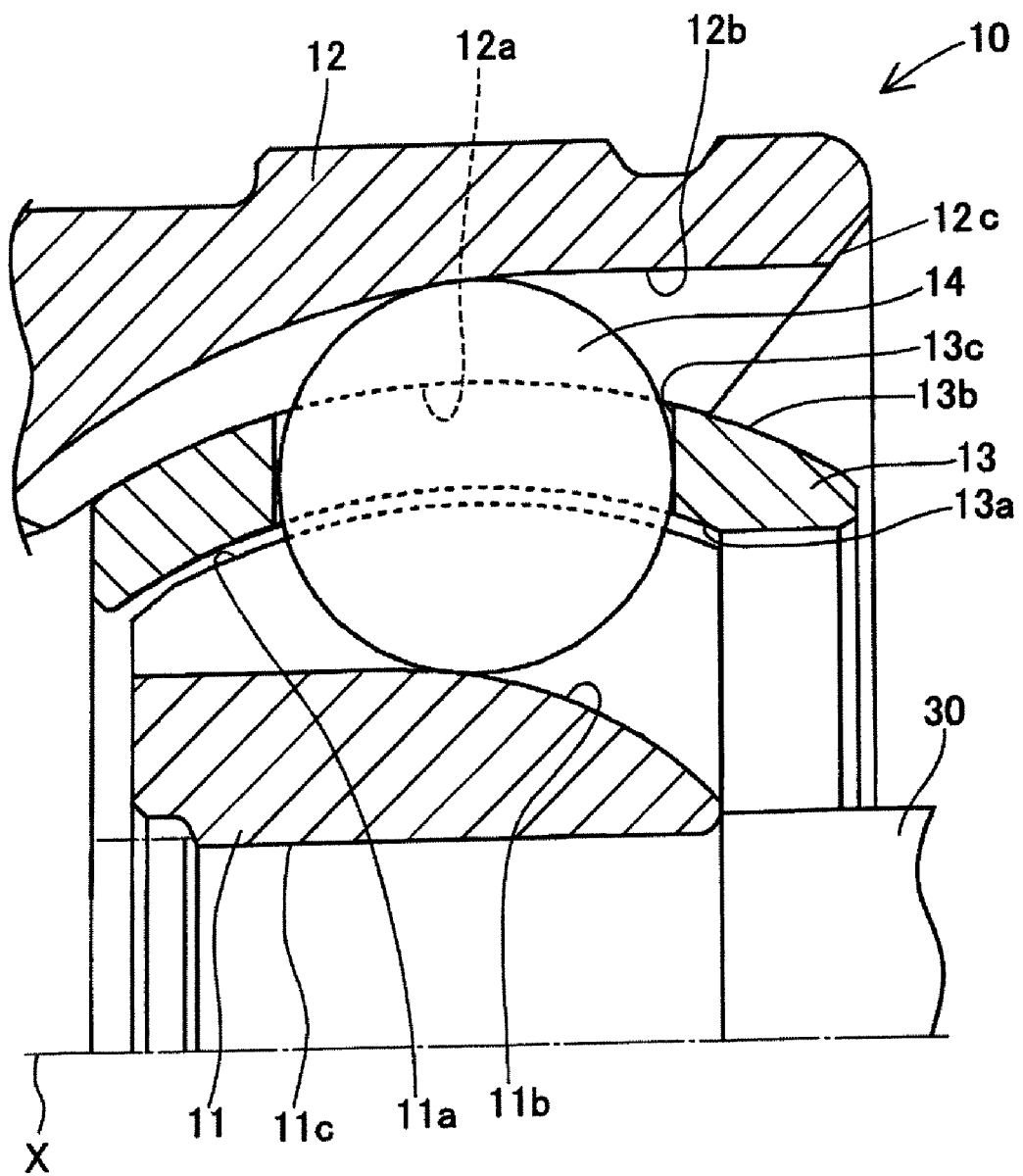
FIG. 1 is an axial section view of a constant velocity joint of an embodiment related to the invention.

FIG. 1 shows an axial section view of the assembly of the constant velocity joint 10 of the embodiment. As shown in FIG. 1, the constant velocity joint 10 is a fixed type constant velocity joint. The constant velocity joint 10 comprises an inner race 11, an outer race 12, a cage 13 and balls 14.

The inner race 11 is a cylinder-like element that is connected to, for example, an intermediate shaft 30 of a drive shaft assembly. The outermost surface 11a of the inner race 11 is a part spherical surface as seen in the axial section view. The outer surface 11a of the inner race 11 is provided with a plurality of inner ball grooves 11b that are arranged in equal angles in the circumferential section and extend radially inward toward the axis of the inner race 11. The inner ball grooves 11b are arranged to correspond in position to the below-described outer ball grooves 12b of the outer race 12. An inner surface of the inner race 11 has serrations 11c in order to mesh with serrations of the intermediate shaft 30.

The outer race 12 is a cup-like element whose bottom is connected to, for example, a hub (not shown). The innermost surface 12a of the outer race 12 is a part spherical surface as seen in the axial section view. The inner surface 12a of the outer race 12 is provided with a plurality of outer ball grooves 12b of the same number as the inner ball grooves 11b. The outer ball grooves 12b are arranged at equal circumferential angles and substantially extend radially outward from the axis of the outer race 12. The direction of the axis X of the outer race 12 is defined as the direction of a rotational axis of the outer race 11. Each outer ball groove 12b curves toward the bottom of the cup so as to gradually approach the rotational axis X. The outer race 12 has a chamfer 12c at its opening end. Because of the chamfer 12c, the intermediate shaft 30 is able to move in a wider range so as to obtain a larger operating angle of the constant velocity joint 10.

The cage 13 is a substantial cylinder-like element that is interposed between the inner race 11 and the outer race 12. The cage 13 has a partial spherical inner surface 13a that corresponds to the outermost surface 11a of the inner race 11. Also, the cage 13 has a partial spherical outer surface 13b that corresponds to the innermost surface 12a of the outer race 12. Therefore, the cage 13 is able to rotate relatively to the inner race 11 and the outer race 12. Further, the cage 13 is provided with a plurality of substantially rectangular holes 13c of the same number as the inner ball grooves 11b, with the rectangular holes 13c arranged at circumferentially equal angles.

Each ball 14 is held by a respective rectangular hole 13c of the cage 13, and is interposed between a respective inner ball groove 11b and outer ball groove 12b to roll therebetween. Therefore torque is transmitted via the balls 14 between the inner race 11 and the outer race 12 at various operating angles.

(2) Detail of the Outer Ball Grooves 12b

Figure 2:
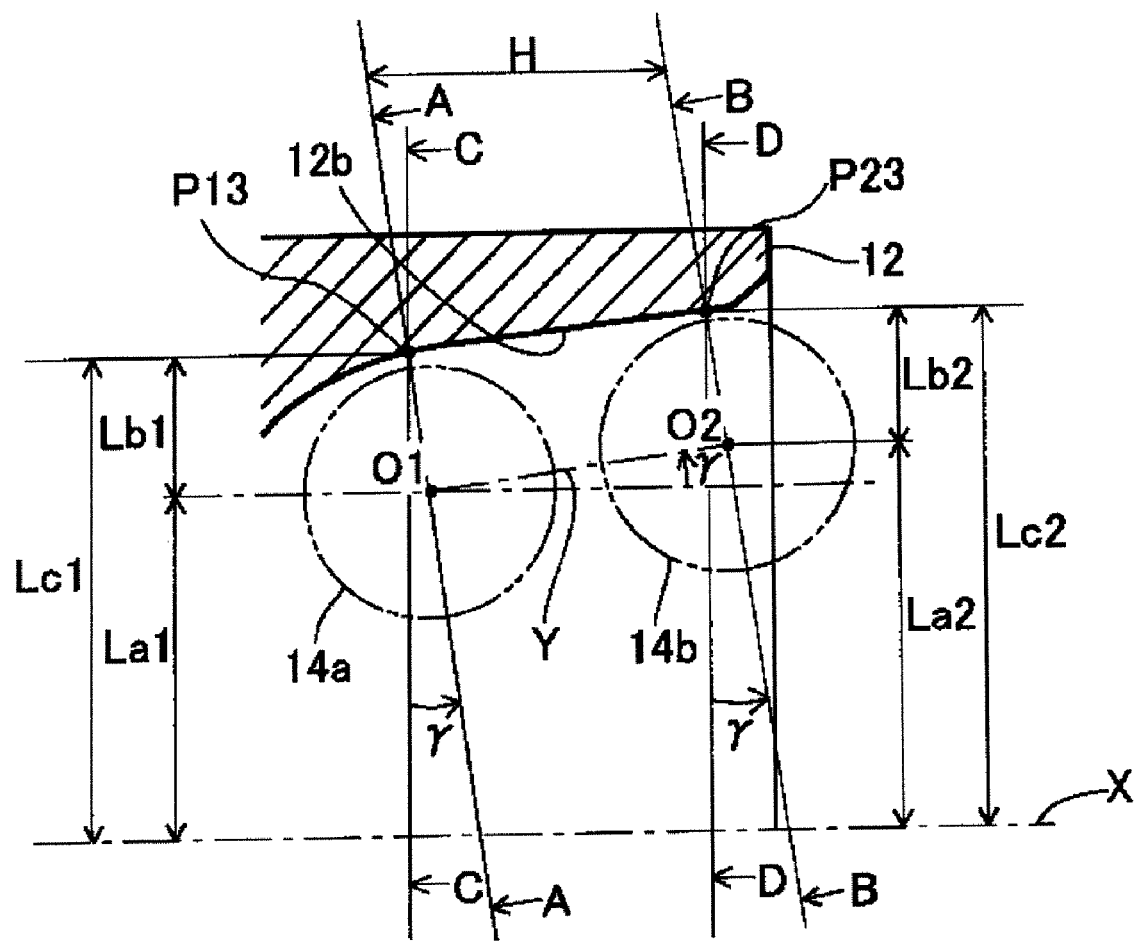
FIGS. 2(a)-2(c) are explanatory drawings of an outer ball groove of an outer race of the constant velocity joint.
Figure 2:
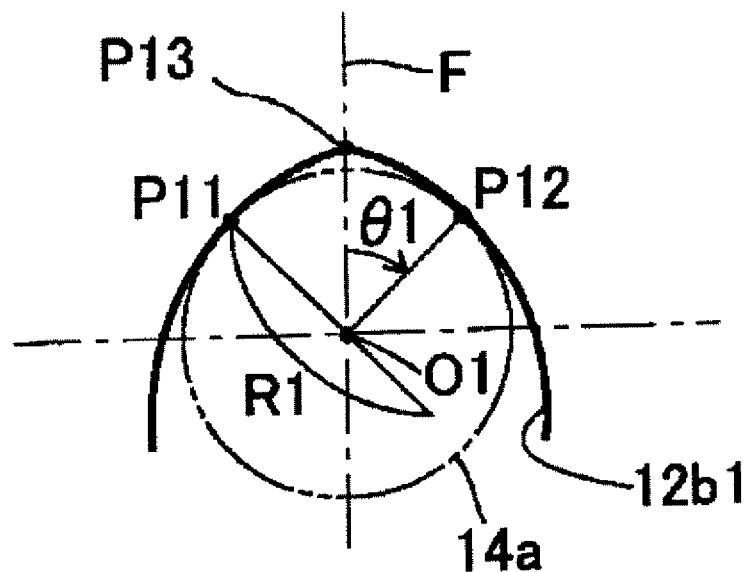
Figure 2:
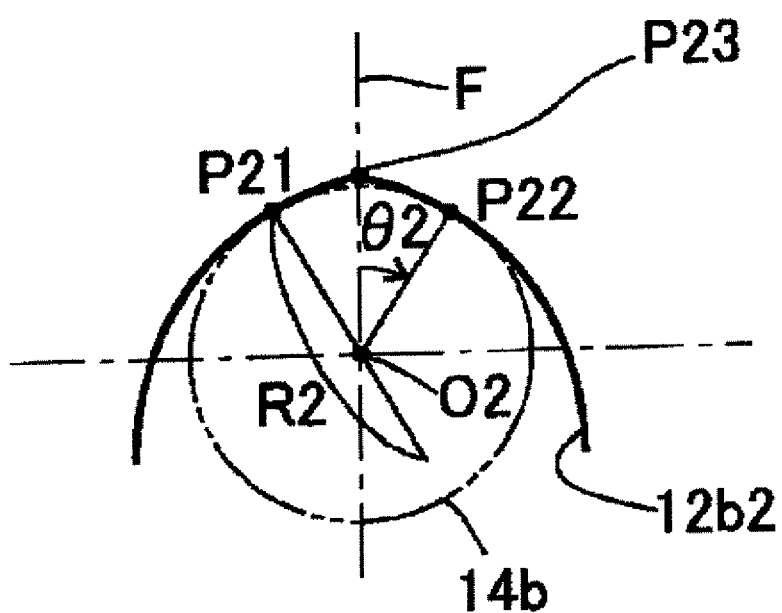
Figure 3:
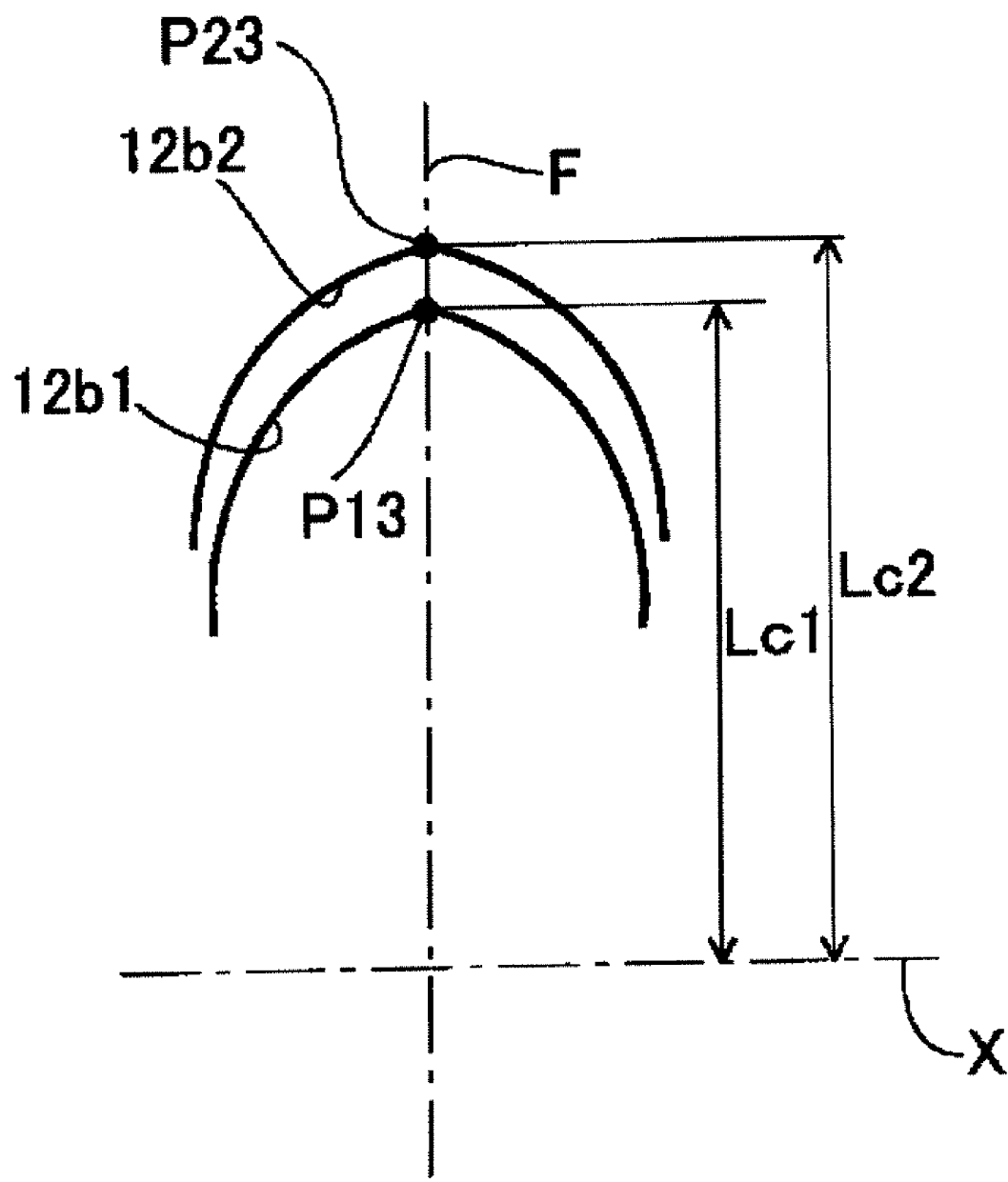
FIG. 3 is an another explanatory drawing of the outer ball groove.

The detail of the outer ball grooves 12b will be described with reference to FIGS. 2 and 3. FIG. 2(a) shows a schematic section view from the center portion to the opening end of the outer race 12 in the direction of the rotational axis of outer race 12. FIG. 2(b) is an A-A section view of FIG. 2(a). In FIG. 2(b), the ball is defined as 14a with the center of the ball 14 at a point O1 in a plane including the ball center O1 and contact points P11 and P12 between the ball 14a and the outer ball groove 12b. (Depending on a rotational direction of the constant velocity joint 10, the torque is transmitted via one of the contact points P11 and P12.) FIG. 2(c) is a B-B section view of FIG. 2(a). In FIG. 2(c), the ball is defined as 14b with the center of the ball 14 at a point O2 in a plane including the ball center O2 and contact points P21 and P22 between the ball 14b and the outer ball groove 12b. (Depending on the rotational direction, the torque is transmitted at one of the contact points P21 and P22.) The center point O1 of the ball 14a in FIG. 2(b) is defined as the A-point and the center point O2 of the ball 14b in FIG. 2(c) is defined as the B-point FIGS. 2(a)-2(c) are schematic for easy understanding so that the size relationship is different from FIG. 1. FIG. 3 is an explanatory drawing that superposes a C-C section upon a D-D section of the outer ball groove 12b shown in FIG. 2(a). The C-C section of FIG. 2(a) is a plane that crosses to the rotational axis X of the outer race 12 perpendicularly and includes a bottom P13 of the outer ball groove 12b on the A-A section. The D-D section of FIG. 2(a) is a plane that crosses to the rotational axis X of the outer race 12 perpendicularly and includes a bottom P23 of the outer ball groove 12b on the B-B section.

The outer ball grooves 12b are concave arcs that are circumferentially arranged in equal angles on the outer race 12. The length of a predetermined zone H (millimeters) of the outer ball grooves between the A-point and the B-point in each outer ball groove 12b creates different contact angles θ (degrees) for each ball 14 at the A-point and the B-point. As shown in FIG. 2(a), a distance La1 between the ball center O1 at the A-point and the rotational axis X of the outer race 12 is smaller than a distance La2 between the ball center O2 at the B-point and the rotational axis X. The ball center O of the ball 14 moves linearly on a line Y joining the ball center O1 at the A-point and the ball center O2 at the B-point by the length of the predetermined zone H (millimeters). (The line Y is a trajectory of the ball center O in the predetermined zone H.) An angle of the line Y and rotational axis X is defined as a ball groove taper angle γ (degrees) that is smaller than 90 degrees. The ball groove taper angle γ (degrees) and the length of the predetermined zone H (millimeters) are linked by the below relation formula (1) or (2).

$$(H+1.3) \geqq 3.8 \gamma^{-0.6} \quad (1)$$

$$H \geqq 5.8 \gamma^{-0.9} \quad (2)$$

In the view of the radial section shown in FIGS. 2(b) and 2(c), each outer ball groove 12b is a combination of two arcs symmetrical about a plane F including its center (corresponding to the ball center O) and the rotational axis X of the outer race 12. Although the outer ball groove forms a Gothic arch or ellipse in general, the embodiment provides the outer ball groove 12b as a combination of two arcs.

At the A-point of the outer ball groove 12b1 as shown in FIG. 2(b), one of the arcs has its center on a line passing through the ball center O 1 and the contact point P11, and its curvature radius is R1. Also, another arc has its center on a line passing the ball center O1 and the contact point P12, and its curvature radius is R1. A ball groove bottom is defined as P13 at the A-point. The contact points P11 and P12 are the points where the ball 14 contacts with the outer ball groove 12b1 when the ball 14 is at the A-point. Where the ball center is positioned at O1, the contact angle θ1 (degrees) at the A-point is an angle between the plane F and the line passing the ball center O1 and the contact point P12 (θ1 is smaller than 90 degrees). At the A-point as shown in FIG. 2(a), a distance Lb1 is a distance between the ball groove bottom P13 and the ball center O1 projected on the C-C section perpendicular to the rotational axis X of the outer race 12.

At the B-point of the outer ball groove 12b2 as shown in FIG. 2(c), one of the arcs has its center on a line passing through the ball center O2 and the contact point P21, and its curvature radius is R2. Also, another arc has its center on a line passing the ball center O2 and the contact point P22, and its curvature radius is R2. A ball groove bottom is defined as P23 at the B-point. The contact points P21 and P22 are the points where the ball 14 contacts with the outer ball groove 12b2 when the ball 14 is at the B-point. Where the ball center is positioned at O2, the contact angle θ2 (degrees) at the B-point is an angle between the plane F and the line passing the ball center O2 and the contact point P22 (θ2 is smaller than 90 degrees). At the B-point as shown in FIG. 2(a), a distance Lb2 is a distance between the ball groove bottom P23 and the ball center O2 projected on the D-D section perpendicular to the rotational axis X of the outer race 12.

Actually, at any contact point, the ball 14 and the outer ball groove 12b are elastically deformed during torque transmitting so that an osculating ellipse is provided between the ball 14 and the outer ball groove 12b.

As shown in FIGS. 2(b) and 2(c), the contact angle θ1 (degrees) at the A-point is larger than the contact angle θ2 (degrees) at the B-point, and the contact angle θ (degrees) gradually and invariably decreases from the A-point toward the B-point in the predetermined zone H (millimeters). Further, due to the decreasing contact angle θ (degrees), the distance between the outer ball groove bottom and the ball center on the plane perpendicular to the rotational axis X gradually and invariably decreases from the A-point toward the B-point in the predetermined zone H (millimeters) (Lb2<Lb1). Thus a distance of the outer ball groove bottom P13 from the ball 14a on the C-C section is larger than distance of the outer ball groove bottom P23 from the ball 14b on the D-D section. And the distance of the outer ball groove bottom from the ball gradually and invariably decreases from the A-point toward the B-point in the predetermined zone H (millimeters), so that the contact angle θ gradually decreases from the A-point to the B-point.

According to the above described formation of each outer ball groove 12b, as shown in FIG. 3, a distance Lc1 between the rotational axis X of the outer race 12 and the ball groove bottom P13 at the A-point is smaller than a distance Lc2 between the rotational axis X and the ball groove bottom P23 at the B-point. Further, the distance between the rotational axis X and the ball groove bottom gradually and invariably decreases from the B-point toward the A-point in the predetermined zone H (millimeters). That is, distance of the outer ball groove 12b from the rotational axis X gradually and invariably increases in the radial direction of the outer race 12, when moving from the A-point (the bottom side of the outer race 12) toward B-point (the opening end of the outer race 12), in the predetermined zone H (millimeters). The predetermined zone H preferably extends substantially to the chamfer 12c at the opening side of the outer race 12. Therefore, each outer ball groove 12 becomes undercut free so as to reduce a cost of manufacturing (e.g. forging, machining, grinding).

(3) Analyzing Whether the Undercut Would Happen

According to such contact angle θ (degrees) decreasing from the A-point to the B-point in the predetermined zone H (millimeters), the inventor analyzed whether an undercut would happen under a changing variety of conditions. The analysis took place with a uniform pseudorandom number about each condition value in Tables 1 to 3 shown in FIG. 5. In Tables 1 to 3, "ball diameter" is defined as a diameter of the ball 14 and "ball groove curvature ratio" is defined as a ratio the curvature radius R1/R2 of the outer ball groove 12b1/12b2 to the radius of the ball 14 at the A/B-point.

As a result of the analysis, it was determined that where all minute zones ΔH within the predetermined zone H (millimeters) have a longer distance Lc (the distance between the rotational axis X of the outer race 12 and the bottom of the outer ball groove 12b) at the opening side of the respective minute zone ΔH than at the (bottom) side of the respective minute zone ΔH longitudinally opposite the opening side, an undercut free state is present. In contrast, it was determined that in the case that any minute zone ΔH has longer distance Lc at the bottom side than at the opening side, undercuts are present.

Figure 4:
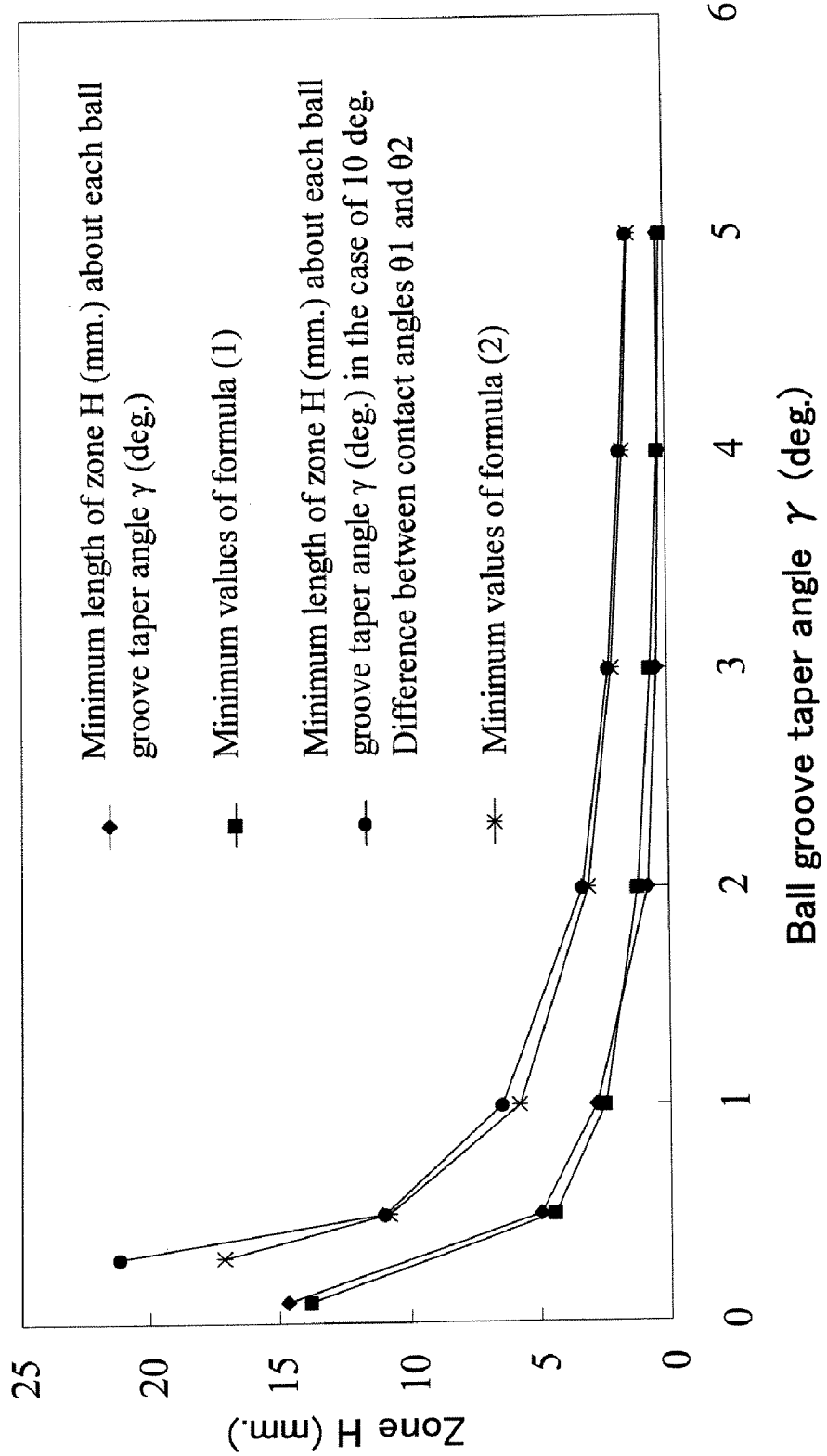
FIG. 4 is a graph of analysis results.

The results of the analysis are shown by a graph of FIG. 4 whose horizontal axis is the ball groove taper angle γ (degrees) and vertical axis is the length of the predetermined zone H (millimeters). In FIG. 4, each lozenge-dot is the minimum length of the predetermined zone H (millimeters) about each ball groove taper angle γ (degrees) in order to make the outer ball groove 12b be the undercut free. Namely, according to the results of the analysis, in the area above the lozenges of FIG. 4 the outer ball groove 12b becomes undercut free. FIG. 4 further shows circle-dots that indicate the undercut free case and especially has a 10 degree difference between the contact angle θ1 (degrees) at the A-point and the contact angle θ2 (degrees) at the B-point. Therefore, in the area above the circle-dots of FIG. 4, the outer ball groove 12b becomes undercut free and obtains 10 degree difference or more between the contact angle θ1 (degrees) at the A-point and the contact angle θ2 (degrees) at the B-point.

FIG. 4 also shows the minimum lengths of the predetermined zone H (millimeters) of the relation formulas (1) and (2). As shown in FIG. 4, the minimum values of the formula (1) are shown by square-dots, approximate the lozenges, whereby undercuts are substantially absent so as to simplify manufacturing. That is, meeting the formula (1) causes decreasing contact angles θ (degrees) from the A-point to the B-point, the ball groove taper angle γ (degrees) increases radially from the A-point to the B-point, and the outer ball groove 12b becomes undercut free. Due to the contact angle θ (degrees) being smaller toward the opening end of the outer race 12, the oscillating ellipse between the ball 12 and the outer ball groove 12b moves toward the bottom of the outer ball groove 12b. Thus the osculating ellipse would not stick out of the chamfer 12c of the outer race 12, so as to increase the operation angle of the constant velocity joint 10. And since the ball groove taper angle γ (degrees) increases radially toward the opening end of the outer race 12, the constant velocity joint 10 obtains a larger operation angle. Further because outer ball groove 12b becomes undercut free, it is easy to manufacture (forge, cut, grind, etc.) the outer race 12.

In the case of meeting the formula (2) as represented by x-dots, the contact angle difference becomes larger between the A-point and the B-point. As shown in FIG. 4, the minimum values of the formula (2) approximate the circle-dots so as to cause a 10 degree or more difference of the contact angle between at the A-point and the B-point in the predetermined zone H (millimeters). Thus the osculating ellipse is reliably prevented from sticking out of the chamfer 12c, so that the constant velocity joint 10 obtains a larger operation angle between the shafts connected with the joint 10.

Obviously, numerous modifications and variations of the present invention are possible in light of the above teachings. It is thereby to be understood that within the scope of the appended claims, the present invention may be practiced otherwise than as specifically described herein.

What is claimed is:

1. A constant velocity joint comprising:
   a cup-like outer race having a rotational axis and a partially spherical inner surface provided with plural outer ball grooves, wherein, a predetermined zone of the length of the outer race, a radial distance between the bottom of each outer ball groove and the rotational axis of the outer race invariably increases when moving toward an opening end of the outer race;
   an inner race having a partially spherical outer surface provided with plural inner ball grooves arranged to correspond in position to the outer ball grooves;
   plural balls interposed between the outer ball grooves and the inner ball grooves; and
   a cage interposed between the outer race and the inner race to hold the balls,
   wherein a contact angle between each ball and each outer ball groove decreases when moving toward the opening end of the outer race in the predetermined zone.

2. The constant velocity joint according to claim 1, wherein:
   a center of each ball moves linearly in the predetermined zone.

3. The constant velocity joint according to claim 2, wherein:
   the length of the predetermined zone H (millimeters) and an angle γ (degrees) between a trajectory of the center of each ball moving and a rotational axis of the outer race are linked by a below relation formula, $$(H+1.3) \geq 3.8\, \gamma^{-0.6}.$$

4. The constant velocity joint according to claim 3, wherein:
   the length H (millimeters) and the angle γ (degrees) are further linked by a below formula, $$H \geq 5.8\, \gamma^{-0.9}.$$

5. A constant velocity joint comprising:
   a cup-like outer race having a rotational axis and a partially spherical inner surface provided with plural outer ball grooves, wherein, in a predetermined zone of the length of the outer race, a radial distance between the bottom of each outer ball groove and the rotational axis of the outer race invariably increases when moving toward an opening end of the outer race;
   an inner race having a partially spherical outer surface provided with plural inner ball grooves arranged to correspond in position to the outer ball grooves;
   plural balls interposed between the outer ball grooves and the inner ball grooves; and
   a cage interposed between the outer race and the inner race to hold the balls,
   wherein a contact angle between each ball and each outer ball groove invariably decreases when moving toward the opening end of the outer race in the predetermined zone.

6. The constant velocity joint according to claim 5, wherein:
   a center of each ball moves linearly in the predetermined zone.

7. The constant velocity joint according to claim 6, wherein:
   the length of the predetermined zone H (millimeters) and an angle γ (degrees) between a trajectory of the center of each ball moving and a rotational axis of the outer race are linked by a below relation formula, $$(H+1.3) \geq 3.8\, \gamma^{-0.6}.$$

8. The constant velocity joint according to claim 7, wherein:

the length H (millimeters) and the angle γ (degrees) are further linked by a below formula, $$H \geqq 5.8\, \gamma^{-0.9}.$$

9. The constant velocity joint according to claim 5, wherein one end of the predetermined zone substantially coincides with the open end of the outer race, such that the outer ball grooves are substantially undercut free.

* * * * *